Sept. 8, 1970                E. R. WINCKLER              3,527,476
COMBINATION TOWING VEHICLE AND TRAILER AND
HITCH ASSEMBLY THEREFOR
Original Filed April 20, 1966              3 Sheets-Sheet 2
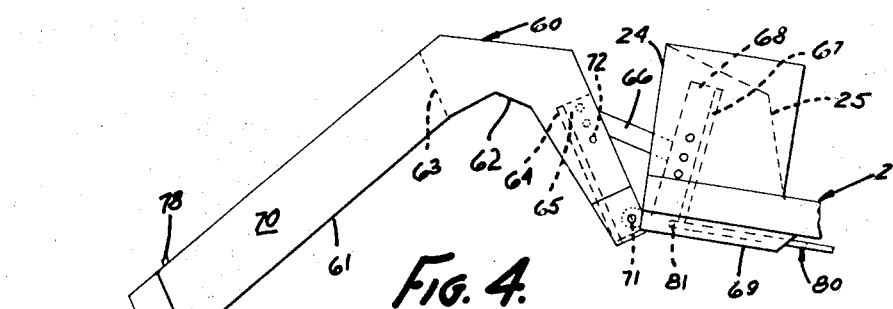
FIG. 4.
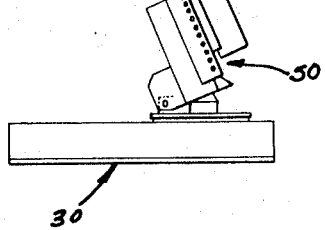
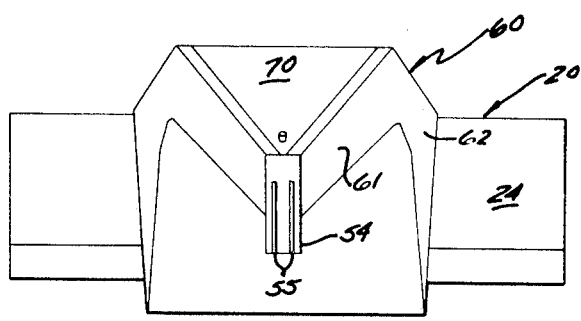
FIG. 5
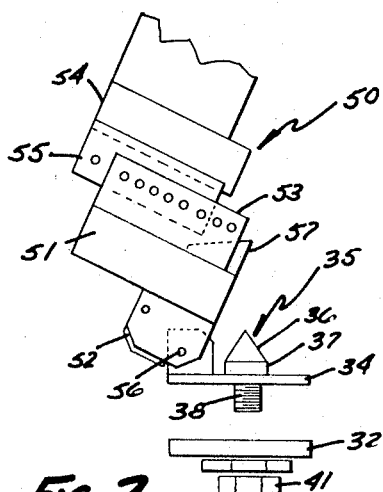
FIG. 7
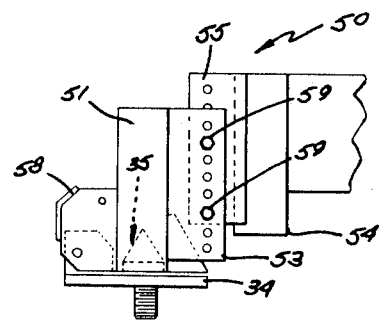
FIG. 9.
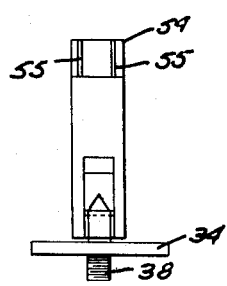
FIG. 8
INVENTOR.
ELMER R. WINCKLER
ATTORNEYS

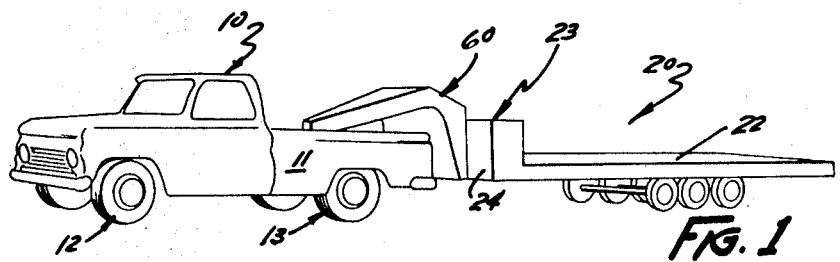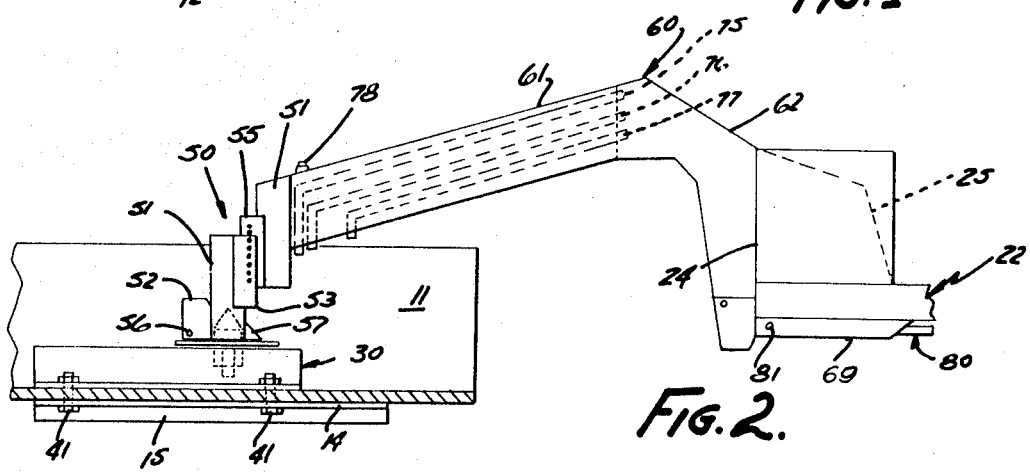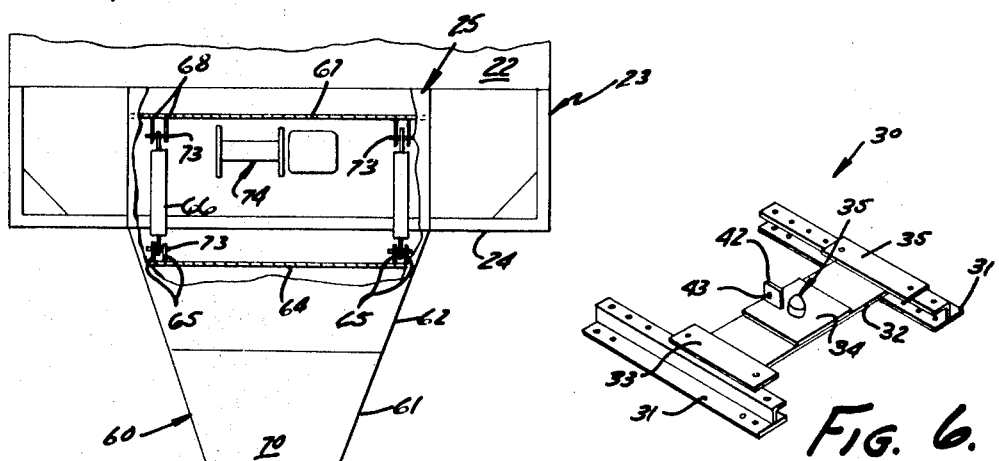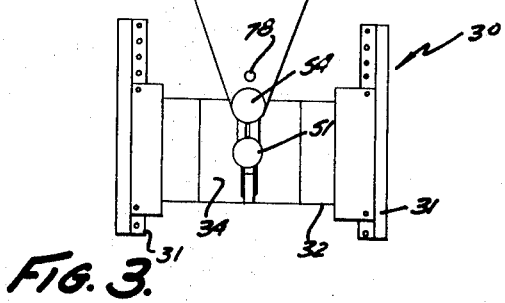

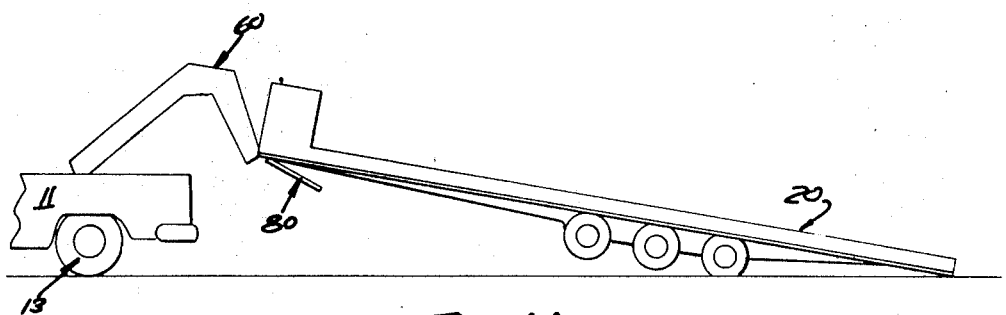
FIG. 11.
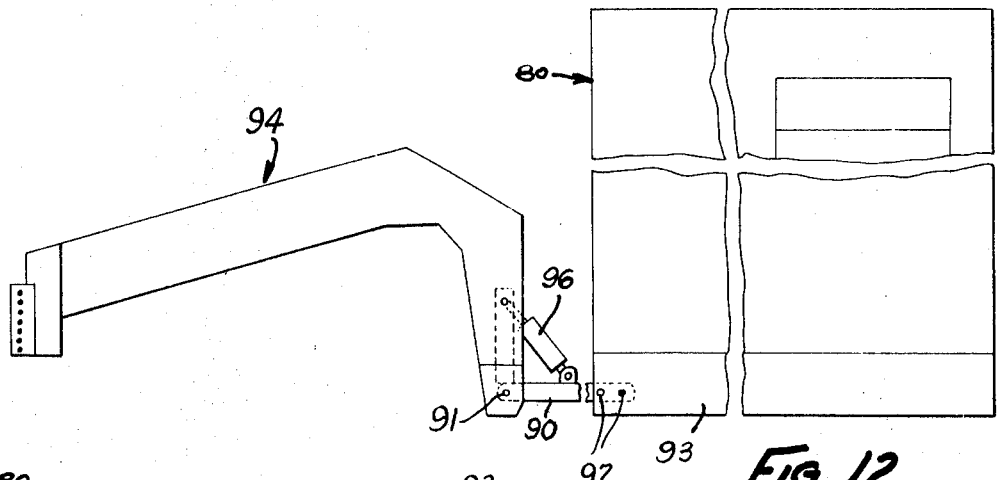
FIG. 12.
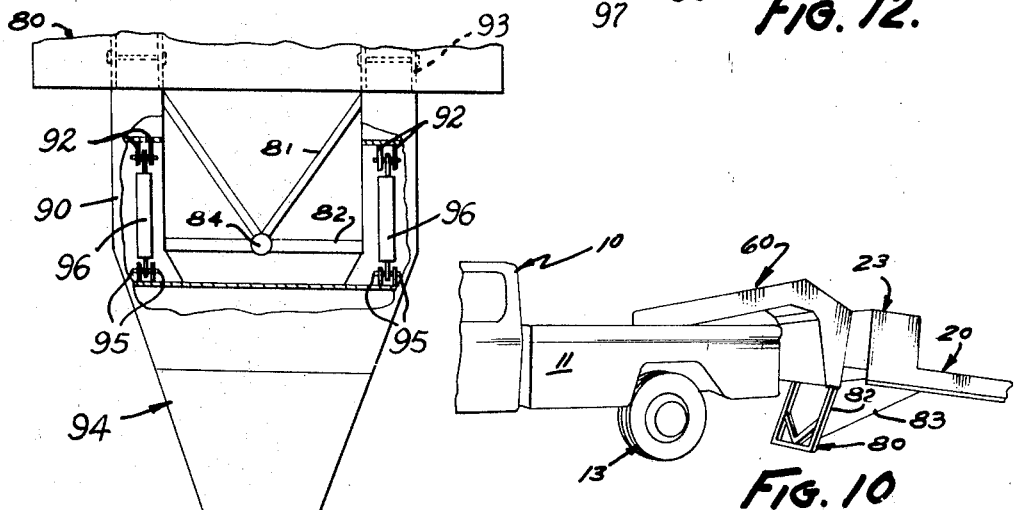
FIG. 13.
FIG. 10
INVENTOR.
ELMER R. WINCKLER
ATTORNEYS

United States Patent Office 3,527,476
Patented Sept. 8, 1970

3,527,476
COMBINATION TOWING VEHICLE AND TRAILER
AND HITCH ASSEMBLY THEREFOR
Elmer R. Winckler, Mitchell, S. Dak., assignor to Dakota
Manufacturing Company, Mitchell, S. Dak., a corporation of South Dakota
Original application Apr. 20, 1966, Ser. No. 544,356, now Patent No. 3,406,852. Divided and this application Oct. 14, 1968, Ser. No. 767,156
Int. Cl. B62d 53/06
U.S. Cl. 280—423                                   7 Claims

ABSTRACT OF THE DISCLOSURE

A hitch assembly adapted for joining a pickup truck and a trailer comprising an arch-shaped tongue pivotably affixed to a removable base in the truck bed, the base being positioned over or forward of the rear wheels thereof. The hitch is pivotably affixed, additionally, to the trailer and powered means are provided for pivoting the hitch with respect to its point of attachment with the truck and, thus, pivoting the rear end of the trailer downwardly or upwardly. Alternatively, the hitch may be detachably affixed to the trailer and the power means utilized to lift the forward end of a trailer into pulling position.

---

This application is a division of co-pending application Ser. No. 544,356 filed Apr. 20, 1966, now U.S. Pat. No. 3,406,852.

This invention relates to a trailer and a hitch assembly therefor and, more particularly, to a hitch assembly particularly adapted for joining a trailer to a multi-purpose towing vehicle in such a manner that the momentum of the trailer will follow the path traveled by the towing vehicle rather than tending to cause it to deviate from its directed course. This invention is additionally adapted for utilization in combination with utility trailers having wheels located centrally to the bed and upon which articles or machines are loaded by raising the front of the trailer until the rear thereof comes into contact with the ground.

It is well-known in the art that heavy trailers should be coupled to the towing vehicle intermediate of its axles rather than to rearwardly overhanging frame members thereof. Such coupling allows the weight carried by the towing vehicle to be relatively evenly distributed over the axles thereof and thus, obviously, enables more positive control of the towing vehicle. Coupling at this point, additionally, decreases the tendency for the momentum of the trailer to cause the rear end of the towing vehicle to be slid sideways when turns are made at relatively high speeds.

In order to capitalize on the physical phenomena described above, it has become customary in the trucking industry to provide heavy duty tractors having a fifth wheel mounted on their frames either directly over the driving wheels or forward thereof. Such an arrangement is entirely satisfactory so long as the particular operation justifies the purchase and maintenance of such tractors solely for the purpose of pulling heavy trailers. If, on the other hand, such purchase and maintenance is not justified, the prior art offers no device whereby trailer connection of the type described can be made to more readily available and multi-purpose vehicles such as pickups or trucks without complete revamping so as to render them no longer usable for other types of hauling operations. This is particularly true insofar as pickups are concerned since the box-like construction of the beds of these vehicles must be removed prior to installing any prior-art type of fifth-wheel device in order to provide sufficient clearance for the trailer to pivot when the towing vehicle is turned.

Where the trailer is to be utilized to transfer equipment, means are preferably provided whereby the bed may be pivoted on the supporting axles until the rearward trailer extremity comes into contact with the ground or other surface upon which the trailer is standing such that the equipment to be transferred can be driven or pulled directly onto the bed from the ground without necessitating usage of heavy ramps which must be manhandled into position. Preferably, the pivoting should be accomplished without necessitating the uncoupling of the trailer from the towing vehicle. This, of course, necessitates one or more pivotable connections in the coupling mechanism such that the towing vehicle may remain stationary on the surface as the forward extremity of the trailer bed is tilted upwardly. Additionally, the tilting should be done by mechanical means so as to permit positioning of the trailer axles and wheels at a longitudinal location conducive to proper trailing and balance. That is to say, that if the trailer axles are placed forwardly a sufficient distance to render it possible to raise the front of the trailer by hand, the resulting over-hang will cause the trailer to be off balance and render reasonable load distribution impossible.

While a number of prior art devices have been proposed for mechanically tilting the rear of trailers into contact with the ground, all of these devices are designed for utilization in combination with the fifth wheel of the commercially standard tractor and, thus, are commercially suitable only in situations justifying the purchase and maintenance expenses of a single-use vehicle. Additionally, such of these devices as are available suffer generally from an inability to positively position the mating vehicle-trailer sections of the coupling device as the rear of the trailer is being raised and lowered. That is to say, that while means must be provided to positively affix the coupling device to the towing vehicle while still allowing relative rotation therebetween, these means must be capable additionally of allowing the coupling device to tilt upwardly as the rearward section of the trailer is lowered. Otherwise, this lowering would be impossible unless sufficient force were provided to raise the rear end of the towing vehicle from the ground.

Another serious drawback of coupling devices currently available is the difficulty encountered in coupling and uncoupling the trailer to the towing vehicle. Usually three or four men are required each time the operation is undertaken. Thus it is not uncommon, particularly where multi-purpose vehicles are being utilized for towing, to perform many operations by tedious and inefficient methods because of the difficulty in getting the proper equipment to the scene.

It is an object of this invention to provide a unique coupling device for utilization in combination with a utility, house or other type of trailer and a towing vehicle whereby the actual coupling may be made above or forward of the rear axle of the towing vehicle.

More particularly, it is an object of this invention to provide a coupling device of the type described which may be utilized in conjunction with a number of different types of multi-purpose towing vehicles without destroying the vehicles' utility for other types of work.

It is an object of this invention to provide a coupling device for utilization in combination with a relatively light towng vehicle wherein the trailer may be leveled by means of a vertical adjustment integrally embodied in the coupling device such that the weight on the vehicle and the balance of the trailer afford optimum towing characteristics.

It is an object of this invention to provide a coupling device for utilization in combination with a pickup truck which allows positive securing of the trailer to the truck frame at a point directly above or forward of its rear axle, permits relatively sharp turns to be made and, yet, does not require the removal of the sides of the bed in order to provide turning clearance.

It is an object of this invention to provide a coupling device of the type described incorporating means for tilting the rear of the trailer to the surface without necessitating the disconnection of the trailer from the towing vehicle.

It is an object of this invention to provide a coupling device of the type described incorporating means for mechanically raising the front of the trailer to be towed into pulling position.

It is an object of this invention to provide a coupling device of the type described which incorporates a hydraulic fluid reservoir integrally therewith wherein hydraulic fluid may be stored.

It is another object of this invention to provide a coupling device incorporating a keeper assembly which may be easily attached to and removed from the towing vehicle and, even when attached thereto, does not render the vehicle unsuitable for other usages.

It is another object of this invention to provide a keeper assembly which positively secures the trailer to the towing vehicle during travel and, yet, which allows the tongue to pivot upwardly therefrom when the rearward end of the trailer is lowered.

It is an object of this invention to provide a keeper assembly which integrally incorporates means for positively circumferentially positioning the keeper-receiving section of the tongue as it is pivoted with respect to the keeper whereby a smooth and trouble-free return to towing position will be experienced each time the rearward section of the trailer is raised to traveling height.

It is another object of this invention to provide a coupling device of the type described which, in addition to incorporating means whereby the rearward end of the trailer may be lowered to the surface, also provides means whereby the forward end of the trailer may be forcefully lowered, thus allowing the trailer to be returned to traveling position even though the weight distribution thereon tends to retain it in its tilted position.

It is yet another object of this invention to provide a coupling device of the type described wherein the connection to and disconnection from the towing vehicle may be made by utilizing a multi-purpose power lift assembly, thus eliminating the necessity for manually lifting the tongue into locking position.

More particularly, it is another object of this invention to provide a coupling device of the type described which permits coupling and uncoupling of the trailer by one person only.

These, as well as other objects of this invention, will be clearly understood by reference to the following specification and accompanying drawings in which:

FIG. 1 is a perspective view of a pickup truck and utility trailer connected by the unique coupling device which is the subject of this invention;

FIG. 2 is a fragmentary side-elevational view of the coupling device;

FIG. 3 is a fragmentary plan view of the coupling device;

FIG. 4 is a fragmentary side-elevational view of the coupling device illustrating the manner in which the rearward end of the trailer may be lowered to the surface;

FIG. 5 is a front-elevational view of the trailer and tongue;

FIG. 6 is a perspective view of the keeper assembly;

FIG. 7 is a fragmentary side-elevational view, partially exploded, of the connection between the tongue and the keeper, assembly illustrating the manner in which the tongue is free to pivot upwardly and off from the keeper assembly;

FIG. 8 is a fragmentary front-elevational view of the keeper assembly and receiving cylinder;

FIG. 9 is a fragmentary side-elevational view of the tongue and keeper assembly showing the tongue in traveling position;

FIG. 10 is a fragmentary perspective view of the combination shown in FIG. 1 with the trailer in loading position;

FIG. 11 is a fragmentary side-elevational view illustrating the mode of coupling and uncoupling the trailer from the towing vehicle;

FIG. 12 is a fragmentary side-elevational view illustrating the manner in which the unique coupling device may be utilized to join a multi-purpose towing vehicle to a house trailer; and FIG. 13 is a fragmentary plan view of the hitch assembly shown in FIG. 12.

Briefly, this invention comprises a coupling device incorporating an arch-shaped tongue. The shape of the tongue enables the device to be utilized in conjunction with a pickup truck having permanent side without impairing the turning capabilities of the combination.

Connection is made to the towing vehicle by means of a keeper assembly having a load bearing plate rotatably affixed to a base member adapted to be attached directly to the vehicle. Extending upwardly from the load bearing plate is a keeper element having a cylindrical lower section and a cone-shaped upper section. A sleeve is pivotably attached to the load bearing plate such that it may swing downwardly and receive the keeper element. The sleeve, in turn, is affixed directly to the tongue of the trailer to be towed. Means are provided for adjusting the height of the tongue with respect to the sleeve such that the trailer may be leveled regardless of the height of the towing vehicle.

The tongue may be pivotably attached to a trailer incorporating one or a series of load bearing axles intermediate its ends such that it may be pivoted about these axles until its rearward end comes into contact with the surface upon which it rests.

One or a plurality of double-acting hydraulic cylinders are positioned between the trailer and the tongue to rotate the tongue about this pivotable connection with the trailer. When the cylinders are expanded, the forward end of the tongue bears against the keeper assembly, thus resulting in the raising of the front section of the trailer and the lowering of the rear section thereof. During this period, the sleeve swings off from the keeper in circumferential fashion but is radially positioned by means of its pivotable connection to the load bearing plate. These cylinders are also utilized to position the tongue for coupling to and uncoupling from the trailer. Conveniently, a section of the tongue may be utilized as a storage reservoir for hydraulic fluid and suitable connection made thereto.

Alternatively, the tongue may be pivotably affixed to the towing vehicle prior to attaching it to the trailer to be towed. In this situation, the hydraulic cylinders may be utilized to raise the front of the trailer into towing position. For example, connection may be made to a house trailer in this manner.

The trailer can be provided with a stand which, when lowered, supports the front of the trailer above its normal traveling position. This stand, in addition to supporting the trailer when it is disconnected from the towing vehicle, also aids in the uncoupling and coupling operations.

Referring now to the figures, a preferred embodiment of this invention, along with a modification thereof, will be described in detail. FIG. 1 shows a pickup truck, indicated generally by the reference number 10, having a standard frame suspended upon a forward axle assembly 12 and a rear axle assembly 13. The box or load-carrying section of the truck has a floor 14 and sides 11. Connected to the truck 10 is a utility trailer indicated generally by the reference numeral 20. The trailer comprises a bed 22 having a system of axles and wheels 21 disposed intermediate the ends thereof and connected thereto in standard fashion. A box-like forward section 23 having a front wall 24 is affixed to the forward end of the trailer in a manner to become apparent hereinafter.

A keeper assembly indicated generally by the reference 30 (see FIGS. 2, 3, 4 and 6 through 9) is affixed to the floor 14 of the box of the pickup truck at a point directly over or forward of rear axle assembly 13. This positioning, as pointed out previously, results in much more satisfactory trailing characteristics than can be achieved by connecting the trailer directly to the rear bumper of the towing vehicle. Keeper assembly 30 consists of a pair of angle base plates 31 having an adjustable cross plate 32 secured thereto by means of securing plates 33. Preferably, angle base plates 31 are of sufficient length to allow lengthwise adjustment of the position of cross plate 32 with respect thereto, thus affording some degree of positional variation in the connection point. Thus, the most satisfactory load bearing point for a particular towing vehicle may be determined subsequent to installation of the angle base plates 31 which are bolted through the pickup floor 14 directly to the frame 15 by means of bolts 41. The length of cross plate 32 may be varied to accommodate different frame spacings or it may slide with respect to securing plates 33 to accomplish this purpose.

Rotatably affixed to cross plate 32 is a swivel plate 34 having a keeper 35 affixed thereto. Keeper 35 has an upper cone-shaped section 36 and a lower cylindrical section 37. A threaded shank extends downwardly from the center of lower cylindrical section 37 (see FIG. 7). Conveniently, the keeper 35 and its depending shank 38 may be formed integrally. The rotatable connection between swivel plate 34 and cross plate 32 is formed by extending shank 38 through a suitable aperture in swivel plate 34, passing shank 38 through a suitable aperture in cross plate 32, placing one or a plurality of washers on shank 38, and turning a nut 41 onto shank 38. Nut 41, of course, must be keyed into position. Conveniently, one or a plurality of grease fittings may be provided on swivel plate 34 so as to allow lubrication of the resulting rotatable connection. The keeper assembly 30 is completed by a vertical pivot tongue 42 having an aperture 43 therein which is affixed to swivel plate 34 forwardly of keeper 35.

The tongue leveler assembly 50 (see FIGS. 2, 3, 4 and 7 through 9) has a keeper receiving sleeve 51 which is adapted to receive keeper 35 and fit snuggly over lower cylindrical section 37 thereof. A pair of pivot tongue receiving lips 52 is welded to sleeve 51 to receive pivot tongue 42. They are pivotably secured thereto by means of a pin 56. Conveniently, the spacing of lips 52 may be maintained by means of cap 58. Affixed to the opposite side of keeper receiving sleeve 51 is a pair of sleeve plates 53 having a series of aligned apertures drilled in their facing surfaces. Similarly, tongue sleeve 54 has a pair of sleeve plates 55 affixed to its forward longitudinal extremity which, like sleeve plates 53, incorporates a series of aligned apertures in the facing surfaces thereof. The spacing between sleeve plates 55 is less than that between sleeve plates 53. Thus, as shown in the figures, sleeve plates 55 pass between sleeve plates 53 and are secured thereto by a series of bolts 59. As shown best in FIG. 9, the resulting arrangement allows tongue sleeve 55 to be vertically adjusted with respect to keeper receiving sleeve by merely removing bolts 59, sliding the sleeve plates 53 and 55 with respect to one another to the desired location, and reinserting bolts 59. This adjustment will be varied as the keeper assembly 30 is transferred between different towing vehicles so that the bed 22 of utility trailer 20 will ride horizontally in travel position regardless of the height of the particular towing vehicle being utilized. Leveler assembly 50 thus provides a means whereby the weight resting upon the rear of the towing vehicle may be restricted for optimum towing performance.

Keeper receiving sleeve 51 also has a leveling gusset 57 affixed thereto for stabilizing the sleeve with respect to swivel plate 34 when the trailer is in traveling position. More importantly, gusset 57 acts as a prying device to release the keeper receiving sleeve 51 from lower cylindrical section 37 of keeper 35, enabling the towing vehicle to descend over sharp grades without binding the keeper assembly 30 and the sleeve 51 in any manner.

The arch-shaped tongue assembly 60 which forms the physical connection between trailer 20 and towing vehicle 10 has an oil reservoir section 61 and a yoke section 62. These two components may, of course, be structurally integral but are separated at their interiors by a partition 63 to form a triangular shaped oil storage area 70 at the front of the tongue. A reinforcing plate 64 extends across the interior of yoke section 62 and a series of four mounting plates 65 are welded perpendicularly thereagainst. A plurality of cylinder receiving apertures 72 are drilled in the upper section of mounting plates 65 while a single hinge-pin aperture is drilled in the lower section thereof. As shown best in FIG. 4, trailer 20 is provided with a pair of hinge brackets 69 affixed directly to the frame thereof and extending forwardly of the front trailer surface. The pivotable connection between the arch-shaped tongue assembly 60 and the trailer is made by passing a pair of hinge pins through the lower apertures in mounting plate 65 and through an aligned aperture in hinge plate 69. Each of the hinge plates 69 will be carried, of course, between adjacent mounting plates 65. Tongue assembly 60 is thus free to pivot downwardly with respect to front wall 24 of trailer 20.

The box-like front section 23 of trailer 20 incorporates an equipment housing indicated generally by the reference numeral 25. A reinforcing plate 67 having a second set of four mounting plates 68 perpendicularly affixed thereto is positioned within equipment housing 25 as shown in FIG. 3. Mounting plates 68 also have three aligned apertures in their upper sections. A pair of hydraulic cylinders 66 are suspended between facing sets of mounting plates 65 and 68 by means of pins 73. Preferably, as viewed in FIG. 4, the cylinder receiving apertures in mounting plates 68 are lower than the apertures in mounting plates 65 so that cylinders 66 slant downwardly in a rearward direction after installation. This positioning, of course, increases the lever arm about pivot point 71 and decreases the hydraulic pressure necessary to raise any given load. As hydraulic cylinders 66 are expanded (see FIG. 4) tongue section 60 pivots downwardly about hinge pins 71. As hydraulic cylinders 66 are retracted, tongue assembly 60 pivots upwardly about pin 71 until such time as they are completely collapsed. Preferably, the cylinders 66 are of a type capable of bearing the tongue about pins 71 when in their relaxed position, thus obviating the necessity of providing sufficient strength in front wall 24 to carry this load. For reasons which will become apparent hereinafter, hydraulic cylinders 66 are preferably of the double-acting type. That is to say, they are capable of exerting force both when they are expanded and when they are retracted.

Whenever hydraulic equipment is utilized it is necessary that some type of storage area be provided for the fluid. Preferably, this storage area is directly connected to the hydraulic system such that fluid loss from minor leakage will be automatically compensated for. Such a storage area may conveniently be provided by partitioning off the front of the tongue section so as to provide a storage reservoir 70 having a capacity of 20 or 30 gallons. This reservoir is filled by means of a plug 78 located on the upper surface thereof.

Since the hydraulic power unit is usually integral with the towing vehicle or carried thereby, some means must be provided for transferring the pressurized fluid from the towing vehicle to the cylinders 66. This may be accomplished conveniently by providing a pair of lines 76 and 77 traversing through reservoir 70, suitable connection being provided at the extremities for the attachment of hydraulic hoses or pipes. Likewise, an electrical conduit 75 may be run through storage reservoir 70 in order to permit the running of electrical leads from the towing vehicle to the trailer. The integral incorporation of the lines and conduit into the tongue assembly obviates the necessity for running hydraulic hoses and electrical conductors between the trailer and the towing vehicle. This, of course, results in a marked lessening of the time and trouble required to make these connections in such a manner that they will not be interfered with when the towing vehicle turns.

If desired, equipment housing 25 may incorporate a hydraulic winch indicated generally by the reference numeral 74 in FIG. 3. This winch, as is well known in the art, allows equipment not embodying its own source of power to be pulled upwardly and loaded onto the trailer when the rear thereof is in its ground abutting position.

In order to assist in the coupling and uncoupling of the device, the trailer is provided with a stand assembly indicated generally by the reference numeral 80 (see FIGS. 2, 4 and 11). The stand may be pivotably attached to hinge brackets 69 rearwardly of their point of attachment to the tongue assembly. A pair of pins 81 may be utilized for this purpose. Uprights 82 pivot downwardly and are positioned by means of chains 83 such that the entire weight of the trailer and tongue assembly are carried thereby. During travel, the stand assembly 80 may be raised into abutting relationship with bottom of trailer bed 22 and secured thereto by any conventional means.

When it is desired to connect the trailer 20 to a suitable towing vehicle such as the pickup truck 10 in FIG. 1, the keeper assembly 30 is initially affixed to the floor thereof by bolting angle braces 31 to the frame. As pointed out previously, the keeper assembly should be positioned such that swivel plate 34 lies directly over or forward of the rear axle of the towing vehicle. Compensation for varying frame widths may be accomplished by loosening securing plates 33 and sliding angle braces 31 closer together or further apart.

Next, the tongue leveler assembly 50 is adjusted so that the trailer will be horizontal following connection of keeper receiving sleeve 51 to keeper 35. Thus, connection is made by placing keeper receiving sleeve 51 over keeper 35 and inserting pin 56 through lips 52 and tongue 42. After suitable hydraulic and electrical connections have been made, the trailer is ready for use.

When it is desired to load a particular piece of equipment onto the trailer, hydraulic cylinders 66 are expanded. This causes tongue assembly 60 to pivot about pins 71, thus raising the front end of the trailer. At the same time as pivoting is occurring about pins 71, keeper receiving sleeve 51 rotates off from keeper 35 in a circumferential manner, the center of the circle lying at the location of pin 56. This latter pivotable connection is necessary to provide the required freedom for rotation to occur about pin 71 at the front of the trailer. Expansion of hydraulic cylinders 66 is continued until such time as the trailer reaches the position shown in FIG. 10—i.e. with its rearward section abutting the ground. In this position, a tractor or other type of self-propelled equipment may be driven onto the trailer. Likewise, winch 74 may be utilized to pull non-propelled equipment onto the trailer. Once the equipment has been loaded, hydraulic cylinders 66 are allowed to collapse, thus returning the trailer to the position shown in FIG. 1. In the event that the trailer is rear-end heavy because of the load distribution thereon or because of design of the trailer, hydraulic cylinders 66 may be activated in a collapsing direction to forcefuly pull the trailer into traveling position. This position may be maintained by retaining the pressure on cylinders 66 or, alternatively, some means (not shown) may be provided for mechanically restricting the counterclockwise (see FIG. 4) pivoting of tongue assembly 60 with respect to trailer 20.

It will be noted from FIG. 4 that three cylinder receiving apertures 72 are provided in each of the mounting plates 65 and 68. The position of cylinder 66 may be varied between these apertures to selectively increase or decrease the amount of lever arm available about pivot pin 71. When the cylinders are in the uppermost position they have the greatest mechanical advantage but, of course, must also expand a great distance to abut the rear end of the trailer against the surface.

The cone-shaped section 36 of keeper 35 performs two separate functions. First, its allows keeper receiving sleeve 51 to pivot from the keeper without binding. Secondly, it acts as a wedging surface as sleeve 51 is lowered to insure that sleeve 61 will properly align with and fit over keeper 35 as the forward end of the trailer is being lowered. Once sleeve 51 encircles cylindrical section 37 of keeper 35, the towing forces are borne by this connection which may be sized such as to prevent the possibility of breakage.

As the towing vehicle turns, swivel plate 34 rotates with respect to cross plate 32. The arch-shape of tongue assembly 60 allows the towing vehicle to turn sharply without fear of binding the oil reservoir section 61 of tongue assembly 60 against the sides 11 of the pickup box. This permits the trailer to be maneuvered into tight positions where loading, unloading, or storage may best be accomplished. The shape of tongue asembly 60 further causes the pulling point on trailer 20 to be lower than the pulling point to towing vehicle 10. That is to say, that pins 71 lie below a line drawn from keeper assembly 30 to the forward axle of trailer 20. Thus, as the towing vehicle accelerates, the forces on the forward section of the trailer are downward rather than upward, resulting in over-all better trailer control.

Disconnection from the towing vehicle may be easily accomplished by expanding cylinders 66 to raise the front of the trailer to a point where stand 80 may swing freely into ground abutting relationship. Once chains 83 have been hooked, cylinders 66 are relaxed. Since uprights 82 position the front of the trailer in slightly elevated position with respect to the surface upon which the vehicles are parked, cylinders 66 cannot completely relax without raising the rear of the towing vehicle. Once a point of equilibrium is reached, pin 56 may be removed and the cylinders completely relaxed. This, of course, results in raising sleeve 51 from keeper 35 and allows the towing vehicle to be moved away from the trailer.

When it becomes necessary to re-attach the trailer 20 to the towing vehicle, the towing vehicle need only be backed under tongue assembly 60 until such time as keeper 35 lies below keeper receiving sleeve 51. Cylinder 66 may then be expanded until the apertures in lip 52 align with the aperture in tongue 42 so that pin 56 may be inserted therethrough. At this point, hydraulic cylinders 66 are expanded further to raise the front of trailer 20 to a point where stand assembly 80 may be swung back into abutting relationship with the trailer and secured thereto. Hydraulic cylinders 66 are then relaxed and the trailer and towing vehicle are ready for travel to a loading destination.

FIGS. 12 and 13 illustrate the manner in which a modification of the hitch device may be utilized to tow a house trailer 80 having a standard A-frame hitch 81. Hinge arms 90 are pivotally mounted at 91 to hitch device 94, mounting cylinder reciving plates 92 attached thereto providing attachment for activating cylinders 96, the cylinders being mounted to the hitch device 94 by plates 95. A bar or support 82 is affixed to hitch device 94 so as to extend between arms 90 and the A-frame connected thereto in standard fashion by ball and socket. Suitable means such as bolts 97 are provided for removably affixing arms 90 to the frame 93 of trailer 80.

In the towing of house trailers, the hitch assembly will ordinarily be carried on the towing vehicle at all times. When it is desired to connect hitch assembly 94 to a particular trailer, cylinders 96 are expanded and the towing vehicle backed under A-frame 81.

As cylinders 96 are contracted, contact is made at 84 which may be conveniently a standard ball hitch. As cylinders 96 are contracted further, the front of trailer 80 is raised to the desired traveling position at which time arms 90 may be bolted to frame 93 by bolts 97.

Hitch assembly 94 allows the load to be carried forward of the rear axle of a multi-purpose towing vehicle affording the same advantages set forth previously in connection with utility trailers. It affords an additional advantage since heretofore no means were available whereby a house trailer tongue could be affixed to the towing vehicle over or forward of the rear axle thereof. Because bar 82 supporting the conventional hitch 81 is mounted on the arms 90, pivoting the arms causes the front of the trailer 80 to tilt up or down.

Once the final destination has been reached, the trailer may be unhooked by loosening arms 90 from frame 93 and expanding cylinders 96.

While a preferred embodiment of this invention has been illustrated in detail along with a modification thereof, it will be apparent to those skilled in the art that many of the teachings incorporated therein will find usage in related towing art areas.

The embodiments of the invention in which an exclusive property or privilege is claimed are defined as follows:

1. A hitch assembly for connecting a trailer to a towing vehicle, said assembly comprising: a tongue having a structural framework; a plurality of panels affixed to said framework so as to form an enclosed hydraulic fluid storage area; means for filling and withdrawing hydraulic fluid from said storage area, at least one hydraulic actuator attached to said tongue, asid storage area being adpted to store hydraulic fluid for said actuator; pressure and return lines passing through and formed integrally with said storage area wherethrough said fluid may be transported to and returned from said actuator and an electrical conduit passing through and formed integrally with said storage area wherethrough electrical wiring may connect said towing vehicle to said trailer.

2. Detachable hitching apparatus for connecting a towing vehicle having a rear wheel axle, wheels mounted on said axle, and a box with upwardly extending sides and a floor to a trailer, said apparatus comprising:
   an arch-shaped tongue;
   means for pivotally affixing said tongue to the floor within the box approximately over the axle, said tongue curving upwardly, rearwardly and then downwardly to a point without said box;
   a hydraulic actuator attached to said tongue;
   hydraulic and electrical conduits passing through and formed integrally with said tongue wherethrough said towing vehicle and said trailer are operatively connected;
   a pair of arms affixed to the downward extremity of said tongue and extending generally rearwardly and horizontally therefrom, and also said arms being attached to said actuator; and
   means for detachably affixing said arms to the trailer to be towed such that the forward weight of the trailer is carried by said arms.

3. The apparatus as defined in claim 2, wherein said tongue has a structural framework;
   a plurality of panels is affixed to said framework so as to form an enclosed hydraulic fluid storage area within said tongue; and further including
   means for filling and withdrawing hydraulic fluid from said storage area, said last named means being fluidly connected with said actuator.

4. The apparatus as set forth in claim 3 which further comprises pressure and return lines passing through and formed integrally with said storage area wherethrough said fluid may be transported to and returned from said actuator.

5. Detachable hitching apparatus for connecting a towing vehicle having a rear wheel axle, wheels mounted on said axle, and a box with upwardly extending sides and a floor to a trailer, said apparatus comprising:
   an arch-shaped tongue;
   means for pivotally affixing said tongue to the floor within the box approximately over the axle, said tongue curving upwardly, rearwardly and then downwardly to a point without said box;
   a pair of arms affixed to the downward extremity of said tongue and extending generally rearwardly and horizontally therefrom;
   means for detachably affixing said arms to the trailer to be towed such that the forward weight of the trailer is carried by said arms, said arms being pivotable with respect to said tongue; and
   means for selectively pivoting said arms.

6. The combination as set forth in claim 5 wherein said trailer is a house trailer having a conventional detachable coupling engaging device affixed to the frame thereof and which further comprises supporting means pivotable with said arms adapted to be engaged by said engaging device whereby, as said arms are pivoted upwardly, the front of said trailer will be raised.

7. The combination as set forth in claim 6 wherein said arms extend rearwardly from said supporting means a sufficient distance to be affixed to the frame of said trailer when the front thereof has been raised.

References Cited

UNITED STATES PATENTS

| Number | Date | Name | Class |
|---|---|---|---|
| 1,982,052 | 11/1934 | Hennessy | 280—421 |
| 2,051,522 | 8/1936 | Graham | 188—142 |
| 2,535,301 | 12/1950 | Le Touneau | 280—5 |
| 2,603,531 | 7/1952 | Gustafson | 280—421 X |
| 2,663,574 | 12/1953 | Martin | 280—423 X |
| 2,963,302 | 12/1960 | Ronk | 280—425 |
| 3,220,750 | 11/1965 | Mead | 280—423 |
| 3,336,050 | 8/1967 | Dale | 280—423 |
| 3,406,852 | 10/1968 | Winckler | 280—423 |

LEO FRIAGLIA, Primary Examiner

U.S. Cl. X.R.

280—5, 425